Aug. 20, 1946.   J. H. COOMBES   2,406,201
BRAKE MECHANISM
Filed Feb. 29, 1944

INVENTOR.
Joseph H. Coombes
BY
John P. Parker
ATTORNEY

Patented Aug. 20, 1946

2,406,201

UNITED STATES PATENT OFFICE 2,406,201

BRAKE MECHANISM

Joseph H. Coombes, Detroit, Mich., assignor to The Budd Company, Philadelphia, Pa., a corporation of Pennsylvania Application February 29, 1944, Serial No. 524,374

5 Claims. (Cl. 188—153)

The invention relates to brake mechanisms and more particularly to such mechanisms adapted for the braking of vehicles, such as railway trucks.

The invention is concerned more especially with brakes of the type disclosed in copending application, Serial No. 399,779, filed June 26, 1941, in which rotary disc-like brake elements are associated with the wheels of a wheel and axle assembly supporting a truck frame, and the non-rotary brake elements cooperating with said rotary elements are mounted on a generally U- or C-shaped brake support which is in turn supported at its sides from the wheel and axle assembly and, at an intermediate point, by the truck frame. Such brake supports generally comprise an enlarged housing in the vicinity of the rotary brake element, which housing encloses, in large part, the brake actuating means and seals it against the entrance of dirt and water.

It is a general object of the invention to provide a simplified actuating means and a simplified housing therefor. To this end the brake levers carrying the non-rotary brake elements coacting with the rotary disc-like element are actuated by a floating cam arranged within the housing and in the preferred embodiment, the cam is, in turn, actuated by a single piston cylinder actuator, the cylinder of which forms a part of the housing wall and is readily removable from the housing to provide easy access to the inside thereof.

Other and further objects and advantages and the manner by which they are attained will become apparent from the following detailed description when read in connection with the drawing forming a part of this specification.

Figure 1:
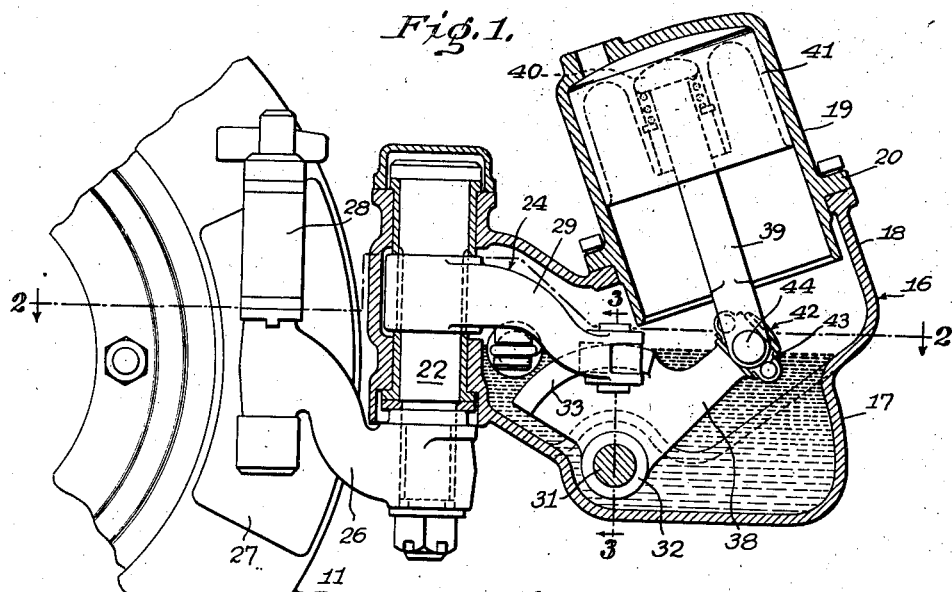
Fig. 1 is a vertical longitudinal sectional view through a brake support housing according to the invention, the section being taken in substantially the transverse central region of the housing except at the left, where the section is taken in the plane of the near lever pivot, the associated parts other than the housing walls being shown in side elevation.
Figure 2:
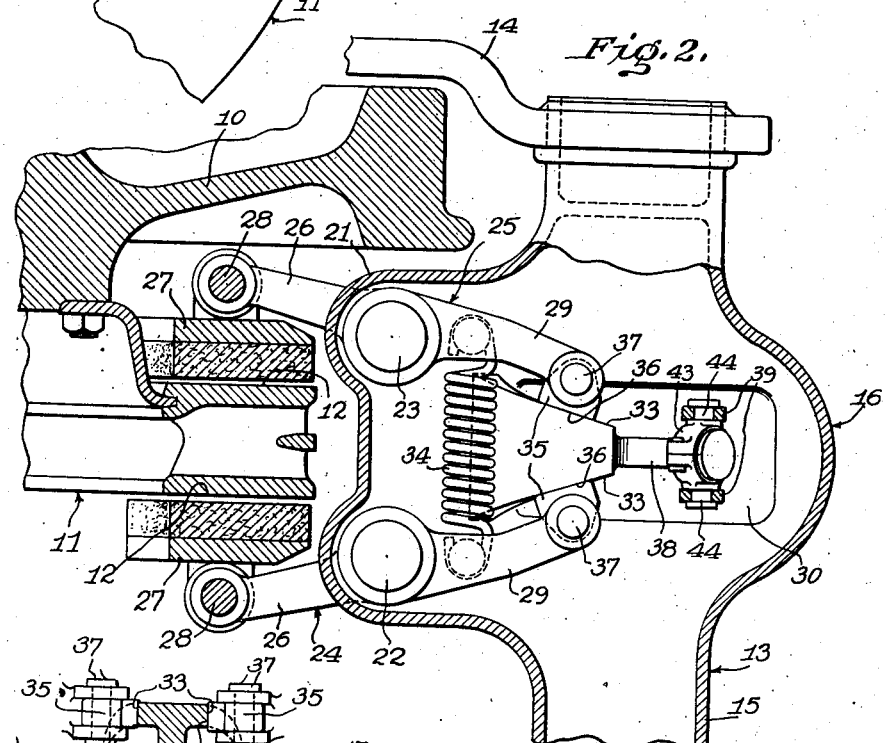
Fig. 2 is a sectional plan view, the section being taken substantially along the line 2—2 of Fig. 1.
Figure 3:
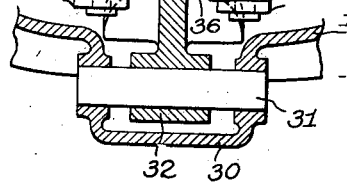
Fig. 3 is a detail sectional view, the section being taken substantially along the line 3—3 of Fig. 1.

In the drawing, a wheel of the wheel and axle assembly is designated by the reference numeral 10, and the disc-like rotary brake element secured thereto to rotate therewith is designated generally by 11. The rotary brake element 11 has the opposed radial braking faces 12, 12.

The generally U- or C-shape brake support is designated generally by the reference numeral 13, one longitudinally extending side arm being shown at 14 and the tubular adjacent end of the transverse member interconnecting the side arms at the opposite sides of the truck being designated 15.

The tubular transverse member 15 is expanded opposite the rotary element 11 into an enlarged housing 16 having a lower portion 17 depending below the main body of member 15 and an upper portion 18 on which is demountably seated a cylinder actuator 19, which is open at its inner end and bolted through a mounting flange 20 to a reinforced marginal seat of an opening in the main body of the housing. Thus the cylinder wall, when the cylinder is secured in place, forms a part of the wall of the housing and when removed it leaves a large opening through which access is had to the interior of the housing.

In a portion of the housing, designated 21, extended toward the periphery of the rotary brake element 11, are pivotally mounted, at 22 and 23, the brake levers 24 and 25, the outside extended arms, as 26, of which carry the respective non-rotary brake elements, such as the segmental shoes 27, pivotally mounted on the respective arms 26 through the pivotal mounting, as 28.

The arms 29 of said levers 24 and 25 extending into the housing are arranged with their ends terminating in the lower portion 16 of the housing in spaced opposed relation. They are thus in a position to be simultaneously actuated to spread them apart and thus swing the levers about their pivots to apply braking pressure to the shoes 27. The novel means for actuating them will now be described.

In a central depressed portion 30 of the housing wall is driven a pivot pin 31 and on this pin is loosely mounted the hub 32 of an arcuate cam member carrying diverging face cams 33 on its opposite sides against which the ends of the lever arms 29 are continuously urged by a tension spring, as 34, interconnecting said arms. Since the arcuate cam member is loosely mounted on the pin 31 it may be said to be floatingly mounted so as to slide laterally on the pin and apply equal forces to the arms.

Any suitable follower means may be provided between the ends of the arms 29 and their respective cam faces 33. As shown, such means may comprise followers 35 having flat faces 36 engaging the respective cam faces 33 and being pivoted at 37 to the ends of the levers. If desired, to reduce friction, roller followers may be substituted.

For actuation of the cam sector, it may be provided as shown with an arm 38, this arm being connected to a strut 39 which has its outer rounded head 40 resting within a recess in the piston 41 slidably arranged in the cylinder of the cylinder actuator 19.

To insure that no binding will occur between the strut and the arm, the connection between them may comprise a joint 42 which will allow limited universal movement. Such means may comprise, as shown, a ring 43 rotatably mounted at the end of the arm 38 and carrying trunnions, as 44, engaging the inner forked end of the strut 39.

To provide continuous lubrication to the parts within the casing and insure the smooth working of the cam sector, the lower part of the housing may, as shown in Fig. 1, be filled with a suitable lubricant.

Ordinarily the cam faces 33 may have sufficient slope to permit the return of the cam sector to inoperative position under the action of the spring 34, but it will be understood that other means, such as a spring secured directly between the cam sector and the housing, may be provided where desired.

While a specific embodiment of the invention has been herein described, it will be understood that changes and modifications may be made without departing from the main features of the invention, and it is desired to cover such changes and modifications in the appended claims.

What is claimed is:

1. In a brake mechanism, a rotary disc-like brake element having opposed braking faces, a pair of non-rotary brake elements arranged in cooperative relation to the opposed faces of said rotary element, a support for said non-rotary elements comprising a closed sealed housing, a pair of brake levers, one cooperating with each non-rotary element, pivotally mounted in said housing and each having an arm extending into said housing, and means for applying equal forces to said arms to force them apart, said means comprising a floatingly mounted wedge-like cam mounted independently of the levers in the lower part of the housing which serves as a lubricant container for lubricating the cam and movable between said arms and power means for moving it disposed within the housing.

2. In a brake mechanism, a rotary disc-like brake element having opposed braking faces, a pair of non-rotary brake elements arranged in cooperative relation to the opposed faces of said rotary element, a support for said non-rotary elements comprising a housing, a pair of brake levers, one cooperating with each non-rotary element, pivotally mounted in said housing, and means for simultaneously actuating said levers, said means comprising a floating cam movable between the adjacent ends of said levers to force them apart, and a cylinder actuator for said cam, said cylinder actuator forming part of the wall of the housing.

3. In a brake mechanism, a rotary disc-like brake element having opposed braking faces, a pair of non-rotary brake elements arranged in cooperative relation to the opposed faces of said rotary element, a support for said non-rotary elements comprising a closed housing, a pair of brake levers, one cooperating with each non-rotary element, pivotally mounted in said housing and each having an arm extending into the housing, and means comprising a floating cam movable between said arms to force them apart, and a single piston cylinder forming a removable part of the housing wall and connected to actuate said cam.

4. In a brake mechanism, a rotary brake element having opposed braking faces, a pair of non-rotary brake elements arranged in cooperative relation to the opposed faces of said rotary element, a support for said non-rotary elements comprising a closed housing having a lower portion adapted to be filled with a lubricant, a cam pivoted in said lower portion and having oppositely inclined faces, a pair of brake levers pivoted in said housing and having arms engaging the respective inclined faces of said cam, said levers having other arms extending outside the housing for cooperation with the respective non-rotary elements, and means including a cylinder actuator forming a removable part of the housing wall for actuating said cam to spread the engaged lever arms, the cam having floating movement in the direction of its pivotal axis, whereby to apply equalized braking forces to the respective non-rotary elements.

5. In a brake mechanism, a brake support, a pair of brake levers pivotally mounted thereon and having spaced arms extending in the same general direction from their pivotal mounting, a wedge cam pivoted directly on the support on an axis transverse to said arms and having cam faces for engagement with said spaced arms, and means for swinging said cam about its pivot axis to force the lever arms apart and thereby apply the brake, said wedge cam being free to move along its pivot axis to equalize the forces applied to the respective brake levers, said means comprising power means connected to said cam by a universal joint.

JOSEPH H. COOMBES.